US010203889B2

(12) United States Patent
Manasse

(10) Patent No.: US 10,203,889 B2
(45) Date of Patent: Feb. 12, 2019

(54) MULTI-TIER FILE SYSTEM WITH TRANSPARENT HOLES

(71) Applicant: salesforce.com, inc., San Francisco, CA (US)

(72) Inventor: Mark Manasse, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 130 days.

(21) Appl. No.: 15/168,870

(22) Filed: May 31, 2016

(65) Prior Publication Data

US 2017/0285978 A1 Oct. 5, 2017

Related U.S. Application Data

(60) Provisional application No. 62/317,388, filed on Apr. 1, 2016.

(51) Int. Cl.

| | |
|---|---|
| ***G06F 21/00*** | (2013.01) |
| ***G06F 3/06*** | (2006.01) |
| ***G06F 17/30*** | (2006.01) |
| ***G06F 21/62*** | (2013.01) |
| ***G06F 12/14*** | (2006.01) |
| ***G06F 21/86*** | (2013.01) |

(52) U.S. Cl.

CPC ............ *G06F 3/0619* (2013.01); *G06F 3/065* (2013.01); *G06F 3/067* (2013.01); *G06F 3/0643* (2013.01); *G06F 12/1408* (2013.01); *G06F 17/3007* (2013.01); *G06F 21/6218* (2013.01); *G06F 21/86* (2013.01); *G06F 2212/1052* (2013.01)

(58) Field of Classification Search

CPC ............................ G06F 3/0619; G06F 3/0643
USPC ........................................................ 713/165
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Salesforce app cloud, "Platform Encyption Architechture", salesforce.com, 2015, 28 pages.

*Primary Examiner* — Anthony D Brown
(74) *Attorney, Agent, or Firm* — Sterne, Kessler, Goldstein & Fox P.L.L.C.

(57) ABSTRACT

The technology disclosed includes access to content and encryption key rotation in a multi-generational file system that has a first tier file, and automatically initializes a second tier file accessible using a same path and file name as the first tier file. The disclosed technology includes copying forward blocks of data from the first tier file to the second tier file, and prior to completion of the copying forward, responding to an access request by accessing the second tier file by providing data available from the second tier file that has been copied forward and by following links associated with the holes to access blocks in the first tier file to provide data from the first tier file. The first tier files are encrypted using a first encryption key; and applying a second encryption key to encrypt data in the second tier files during the copying forward and write access.

25 Claims, 7 Drawing Sheets

(56) References Cited

U.S. PATENT DOCUMENTS 5,774,544 A * 6/1998 Lee .................... G06F 11/006 380/277
5,819,038 A 10/1998 Carleton et al.
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
6,092,083 A 7/2000 Brodersen et al.
6,161,149 A 12/2000 Achacoso et al.
6,169,534 B1 1/2001 Raffel et al.
6,178,425 B1 1/2001 Brodersen et al.
6,189,011 B1 2/2001 Lim et al.
6,216,135 B1 4/2001 Brodersen et al.
6,233,617 B1 5/2001 Rothwein et al.
6,266,669 B1 7/2001 Brodersen et al.
6,295,530 B1 9/2001 Ritchie et al.
6,324,568 B1 11/2001 Diec
6,324,693 B1 11/2001 Brodersen et al.
6,336,137 B1 1/2002 Lee et al.
D454,139 S 3/2002 Feldcamp
6,367,077 B1 4/2002 Brodersen et al.
6,393,605 B1 5/2002 Loomans
6,405,220 B1 6/2002 Brodersen et al.
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans
6,732,095 B1 5/2004 Warshavsky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,772,229 B1 8/2004 Achacoso et al.
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker et al.
6,829,655 B1 12/2004 Huang et al.
6,842,748 B1 1/2005 Warner et al.
6,850,895 B2 2/2005 Brodersen et al.
6,850,949 B2 2/2005 Warner et al.
7,062,502 B1 6/2006 Kesler
7,069,231 B1 6/2006 Cinarkaya et al.
7,069,497 B1 6/2006 Desai
7,181,758 B1 2/2007 Chan
7,289,976 B2 10/2007 Kihneman et al.
7,340,411 B2 3/2008 Cook
7,356,482 B2 4/2008 Frankland et al.
7,401,094 B1 7/2008 Kesler
7,412,455 B2 8/2008 Dillon
7,508,789 B2 3/2009 Chan
7,603,483 B2 10/2009 Psounis et al.
7,620,655 B2 11/2009 Larsson et al.
7,698,160 B2 4/2010 Beaven et al.
7,779,475 B2 8/2010 Jakobson et al.
7,851,004 B2 12/2010 Hirao et al.
8,014,943 B2 9/2011 Jakobson
8,015,495 B2 9/2011 Achacoso et al.
8,032,297 B2 10/2011 Jakobson
8,073,850 B1 12/2011 Hubbard et al.
8,082,301 B2 12/2011 Ahlgren et al.
8,095,413 B1 1/2012 Beaven
8,095,594 B2 1/2012 Beaven et al.
8,209,308 B2 6/2012 Rueben et al.
8,209,333 B2 6/2012 Hubbard et al.
8,275,836 B2 9/2012 Beaven et al.
8,457,545 B2 6/2013 Chan
8,484,111 B2 7/2013 Frankland et al.
8,490,025 B2 7/2013 Jakobson et al.
8,504,945 B2 8/2013 Jakobson et al.
8,510,045 B2 8/2013 Rueben et al.
8,510,664 B2 8/2013 Rueben et al.
8,566,301 B2 10/2013 Rueben et al.
8,646,103 B2 2/2014 Jakobson et al.
8,756,275 B2 6/2014 Jakobson
8,769,004 B2 7/2014 Jakobson
8,769,017 B2 7/2014 Jakobson
2001/0044791 A1 11/2001 Richter et al.
2002/0072951 A1 6/2002 Lee et al.
2002/0082892 A1 6/2002 Raffel et al.
2002/0129352 A1 9/2002 Brodersen et al.
2002/0140731 A1 10/2002 Subramaniam et al.
2002/0143997 A1 10/2002 Huang et al.
2002/0162090 A1 10/2002 Parnell et al.
2002/0165742 A1 11/2002 Robins
2003/0004971 A1 1/2003 Gong et al.
2003/0018705 A1 1/2003 Chen et al.
2003/0018830 A1 1/2003 Chen et al.
2003/0066031 A1 4/2003 Laane
2003/0066032 A1 4/2003 Ramachandran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker
2003/0120675 A1 6/2003 Stauber et al.
2003/0151633 A1 8/2003 George et al.
2003/0159136 A1 8/2003 Huang et al.
2003/0187921 A1 10/2003 Diec
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2006/0021019 A1 1/2006 Hinton et al.
2009/0063415 A1 3/2009 Chatfield et al.
2009/0100342 A1 4/2009 Jakobson
2009/0177744 A1 7/2009 Marlow et al.
2011/0218958 A1 9/2011 Warshavsky et al.
2011/0247051 A1 10/2011 Bulumulla et al.
2012/0042218 A1 2/2012 Cinarkaya et al.
2012/0233137 A1 9/2012 Jakobson et al.
2012/0290407 A1 11/2012 Hubbard et al.
2013/0212497 A1 8/2013 Zelenko et al.
2013/0247216 A1 9/2013 Cinarkaya et al.

* cited by examiner 314 325

| Directory Entries | Inode Table<br>Tier Number | Block List | Index |
| --- | --- | --- | --- |
| /home/anna/ | 3 | k | $(b,d)_{k1} \ldots (b,d)_{kn}$ |
| | 2 | j | $(b,d)_{j1} \ldots (b,d)_{jn}$ |
| | 1 | i | $(b,d)_{i1} \ldots (b,d)_{in}$ |
| /etc/passwd | ... | ... | ... |

Fig. 3

MULTI-TIER FILE SYSTEM WITH TRANSPARENT HOLES

CROSS REFERENCE

This non-provisional application claims priority to U.S. Provisional Application No. 62/317,388, entitled "MULTI-TIER FILE SYSTEM WITH TRANSPARENT HOLES", filed 1 Apr. 2016 and naming inventor Mark Manasse. This provisional application is incorporated by reference herein.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

As businesses build larger data repositories for big data analytics, how data at rest is protected is becoming a key concern among security administrators. As more customers store personally identifiable information (PII), sensitive, confidential or proprietary data, enterprises must ensure the privacy and confidentiality of that data to meet both external and internal data compliance policies. Compliance and regulation requirements are designed to protect consumer information, personal data and customer information from unauthorized sources.

The problem of protecting data that leaves the premise and traverses the cloud is a challenge that takes precedence for today's connected businesses. Some analysts are estimating that by 2017 two-thirds of all workloads will be processed in the cloud and 1.4 zettabytes (1.4 times ten to the twenty-first power) of data will be flowing over global networks meaning that the majority of data will be in motion and remain in motion as it traverses clouds. The concept of data at rest is undergoing redefinition—data at rest is moving into the cloud at least partly due to hosted big data analytics platforms, cloud based Hadoop file systems and cloud based backup and disaster recovery systems.

Every industry has its own unique compliance and governance requirements. Customers need an extra level of control to meet internal or regulatory compliance requirements. IT departments and developers need to be able to build and maintain a layer of trust, transparency, compliance, and governance into business-critical apps.

Encryption makes it possible for users to encrypt their most sensitive data and files across their apps, while retaining important app functionality like search, workflow, and validation rules. Cloud-based applications need to support users to encrypt data and files, while retaining full control over the management of the encryption keys.

Existing encryption tools and services can be mapped onto virtual drives that can provide flexibility, and efficient, transportable, and deployable-in-the-public-cloud forms of volume encryption. In the aftermath of using such an encryption service, the question arises of how to handle client-driven encryption key rotation; that is, a change to the encryption key used to protect a tenant, typically driven by the tenant after the departure of an employee with knowledge of the key, or due to regulatory, security policy, or more nefarious choices by the client. In some use cases, tenants are offered the option of configuring their system to rotate encryption keys daily, as desired.

For encryption key rotation, a system must maintain a list of keys to be used for decrypting and encrypting tenant data, and the system must be able to apply these keys as the software needs to read the corresponding data. Additionally, to migrate from an old encryption key to a new encryption key, existing data must be read and re-encrypted, a process which can take hours. To avoid service outages for customers who choose to rotate keys, an enterprise needs to, at times, be willing to apply old encryption keys as well as new encryption keys to data that needs to flow into their applications, at least to perform on-the-fly re-encryption.

The requirements described above for encryption key rotation complicate the view of an application: if the appropriate key cannot be used at the operating system layer to force decryption on reads and encryption on writes, the application will need greater insight into the appropriate encryption keys and the segments of the underlying files to which they apply.

Existing solutions for encryption key rotation limit the amount of data per tenant to be small enough to re-encrypt at the moment of key rotation (using enough parallelism to make this fast), or take the tenant out of service (at least for writes) for the duration of re-encryption, or specially code the encryption keys into a known-and-implemented-by-the-application encryption tool.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The disclosed technology for implementing file system level key rotation in a multi-tier file system with transparent holes makes it feasible to sidestep three issues: a limit that ensures a small-enough quantity of data, per tenant, to be able to re-encrypt at the moment of key rotation; taking the tenant out of service for the duration of re-encryption; and specially coding the encryption keys into an encryption tool known by the application.

To provide the appearance of no encryption to the application layer, in the non-rotation encryption key use case, the disclosed technology would use a platform-independent disk encryption on-disk format to facilitate compatibility and interoperability among different applications, and to assure password management implemented in a secure and documented manner. This approach enables the presentation of files which are, when disk-resident, encrypted, but which are fully decrypted as they are moved into main memory.

The disclosed technology includes a method of access to content in a multi-generational file system that includes using a file system that has a first tier file in persistent memory. The file system automatically initializes a second tier file in the persistent memory, wherein the second tier file is accessible using a same path and file name as the first tier file, and the second tier file has one or more holes as placeholders for data in the first tier file, the holes having links that refer read access to blocks in one or more earlier tiers of the second tier file. The method includes copying forward blocks of data from the first tier file to the second tier file, and prior to completion of the copying forward, the file system responds to an access request by accessing the second tier file by providing data available from the second tier file that has been copied forward and by following links associated with the holes to access blocks in the first tier file to provide data from the first tier file.

Also disclosed, the method further includes the file system automatically initializing a third tier file which is accessible using a same path and file name as the second tier file. The third tier file has one or more holes as placeholders for data in the second tier file, and the holes have links that refer read access to blocks in one or more earlier tiers of the third tier file. The method includes applying the copying and the responding to an access request for the third tier file, and prior to completion of copying forward of data from the second tier file to the third tier file, the file system follows links associated with the holes to access blocks in the second tier file to provide data from the second tier file.

The method can further include additional tiers, each accessible using the same path and file name as the preceding tier file, and the holes having links that refer read access to blocks in one or more earlier tiers of the file. The method includes applying the copying and the responding to an access request for the additional tier file, and prior to completion of copying forward of data from the preceding tier file to the additional tier file, the file system follows links associated with holes to access blocks in the previous tier file to provided data from the previous tier file.

For implementing encryption key rotation, the disclosed method includes the first tier file and other files of the first tier encrypted using a first encryption key; and applying a second encryption key to encrypt data in the second tier file and other files of the second tier during the copying forward and write access. The method further includes applying a third encryption key to encrypt data in a third tier file and other files of the third tier during the copying forward and write access.

The disclosed technology solves key rotation at the file system layer, allowing client application software to remain blissfully ignorant of the keys involved, other than increasing the OS involvement at tenant login time to supply the necessary suite of keys to open all of the tenant files with matching keys, and to construct the union file system needed.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 shows example inode table entries for multiple tiers in a file system.

DETAILED DESCRIPTION

Introduction

Figure 1:
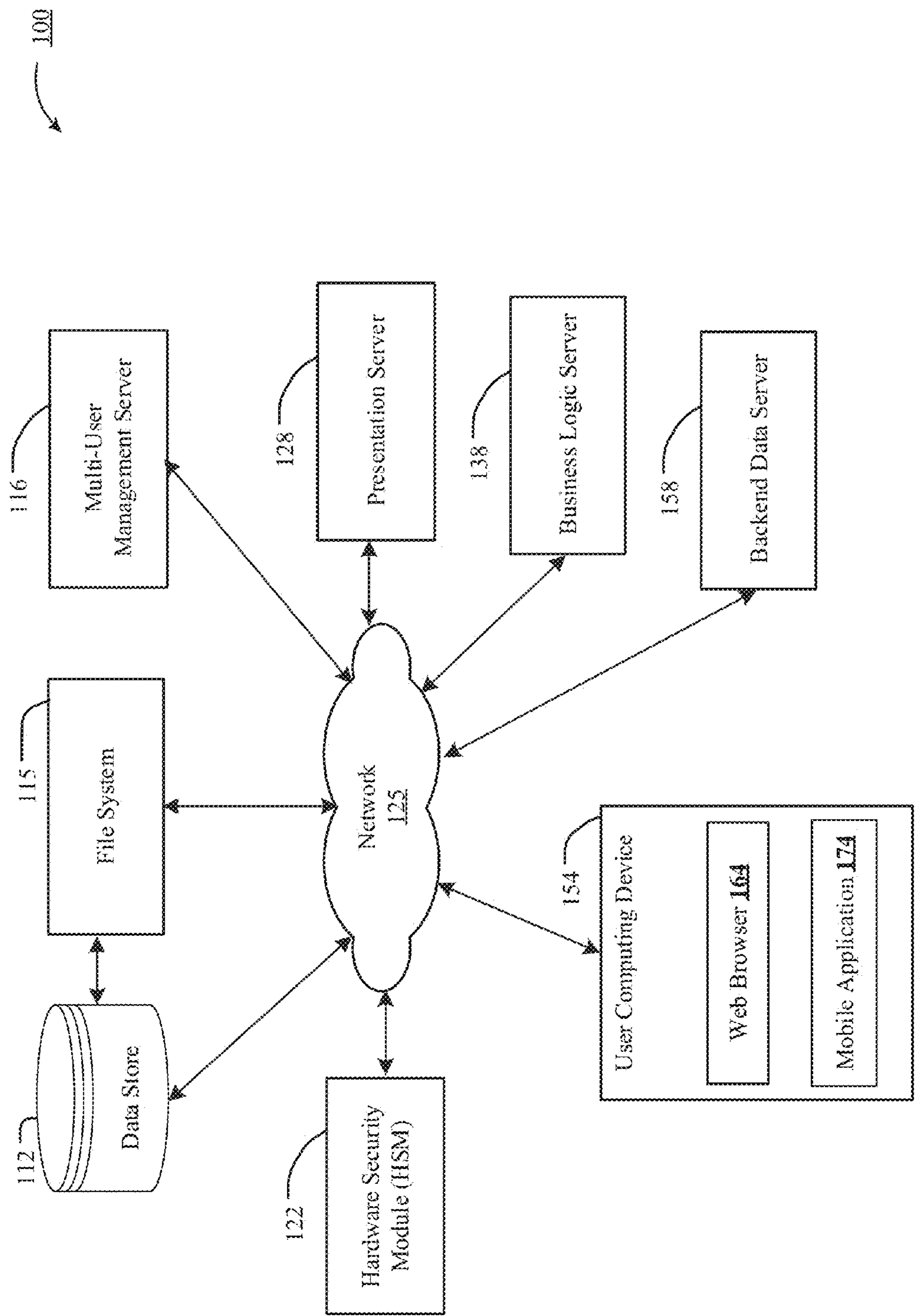
FIG. 1 illustrates one implementation of an environment for access to content in a multi-tier file system.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The disclosed technology for implementing file system level key rotation in a multi-tier file system with transparent holes includes copying forward by reference instead of by value saves space, minimizing over-allocation of resources. A per-tenant encrypted file system, implemented to prevent inadvertent transmission of customer data to other tenants or to third parties, would include creating an encrypted virtual drive large enough to hold all the data owned by a tenant—and likely would include over-allocation, to avoid under-allocating resources as tenants grow.

For encryption key rotation, a system must maintain a list of keys to be used for decrypting and encrypting tenant data, and the system must be able to apply these keys as the software needs to read the corresponding data. Additionally, to migrate from an old encryption key to a new encryption key, existing data must be read and re-encrypted, a process which can take hours. To avoid service outages for customers who choose to rotate keys, an enterprise needs to, at times, be willing to apply old encryption keys as well as new keys to data that needs to flow into their applications, at least to perform on-the-fly re-encryption. The disclosed technology enables read access during copying forward from an older to a newer generation of a file; the existing data file is not locked and updates are block-wise.

The disclosed technology implements key rotation at the file system layer—including a method in which the first tier file and other files of the first tier are encrypted using a first encryption key; and applying a second encryption key to encrypt data in the second tier file and other files of the second tier during the copying forward and write access. The method further includes applying a third encryption key to encrypt data in a third tier file and other files of the third tier during the copying forward and write access.

To allow for rapid key rotation, one implementation of the disclosed technology includes the use of a union file system to allow the construction of a single file system in which the contents are drawn from a collection of file systems, all responding to a single mount point.

Key rotation need not happen instantly in order to be able to see existing data, because the user can see existing data through the holes. The old key must continue to be operational until the copy forward is complete. File system level encryption key rotation implies that a former employee may have access to a prior version of data, either because they took a copy or because they have the old key, but they cannot write to a new version of the file or access updated or previously unread or uncopied data, once the key rotation has taken place. This narrowed security objective of key rotation is practical and useful.

By implementing whole-file copy-forward, the file system can be fully writable, implementing copy-on-write to avoid migration of files which are not actually written.

Existing encrypted files can retain presentation of their data (after encryption) to the unified file, while newly-written data could exist in a file whose underlying data storage uses the newest key. By carefully aligning sparse parts of the underlying files, existing data can show through the upper layers of the directory stack to provide the appearance of a single unencrypted file, whose contents are the concatenation of the decryption of the existing pieces each using the key appropriate to the segment. By aligning the writable area of the file at the end of these concatenated pieces, we can provide the appearance of an extensible file. An environment for accessing content in a multi-tier file system is described next.

Environment for Accessing Content in a Multi-Tier File System

FIG. 1 illustrates one environment 100 for accessing content in a multi-tier file system. Environment 100 can include a data store 112, file system 115, multi-user management server 116, presentation server 128, business logic server 138, backend data server 158, hardware security module (HSM) 122 and user computing device 154.

Multi-user management server 116 administers access to multiple users and companies for an enterprise, via both browser UIs and mobile applications, limiting access to authorized users and managing encryption keys and related access for users and companies. For some use cases, multi-user management server 116 administers platform-level encryption, designed to allow retention of critical app functionality—like search, workflow, and validation rules—as well as full control over encryption keys, setting encrypted data permissions to protect sensitive data from unauthorized users. In one implementation, multi-user management server 116 implements Linux Unified Key Setup (LUKS) disk encryption. In another use case, multi-user management server 116 implements BitLocker encryption to protect data by providing encryption for entire volumes. Hardware security module (HSM) 122 includes a dedicated crypto processor that is specifically designed for the protection of encryption keys inside a hardened, tamper-resistant device.

Data store 112 includes personal data and customer information in database tables, relationships and UI elements—including, but not limited to metadata—data about the data itself.

User computing device 154 includes a web browser 164 and/or a mobile application 174. In some implementations, user computing device 154 can be a personal computer, laptop computer, tablet computer, smartphone, personal digital assistant (PDA), digital image capture devices, and the like.

One architectural pattern for implementing web services includes browser facing applications for business to business communications, via three tiers of services. Presentation server 128, business logic server 138 and backend data server 158 could run on the same server, and typically are implemented on separate servers, including clustered high performance backend data servers.

In some implementations, the modules of environment 100 can be of varying types including workstations, servers, computing clusters, blade servers, server farms, or any other data processing systems or computing devices. Modules can be communicably coupled to the data store via a different network connection. For example, multi-user management server 116 can be coupled via the network 125 (e.g., the Internet) and file system 115 can be coupled to a direct network link and can additionally be coupled via a direct link to data store 112. In some implementations, user computing device 154 may be connected via a WiFi hotspot.

In some implementations, network(s) 125 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In other implementations, environment 100 may not have the same elements as those listed above and/or may have other/different elements instead of, or in addition to, those listed above.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The disclosed technology for accessing content in a multi-tier file system includes the file system automatically initializing a first tier. A second tier file is accessible using a same path and file name as the first tier file, and the second tier file has one or more holes as placeholders for data in the first tier file. The holes have links associated with read access to blocks in one or more earlier tiers of the second tier file. Similarly, an automatically initialized third tier file is accessible using the same path and file name as the second tier file, the third tier file has one or more holes as placeholders for data in the second tier file, and the holes have links that refer read access to blocks in one or more earlier tiers of the third tier file. In some use cases, a tier zero, or tier negative-one can also be included in the file system setup.

The disclosed technology applies the concept of a sparse file to use file system space more efficiently when the file itself is mostly empty. This is achieved by writing brief information (metadata) representing the empty blocks to disk instead of filling the disk space which would make up the empty blocks. The full block size is written to disk as the actual size only when the block contains non-empty data. When reading sparse files, the file system can transparently convert the metadata representing empty blocks into blocks filled with zero bytes at runtime, a conversion that is transparent to the application.

Conceptually, a metaphor utilizing stacking panes of transparent glass painted with opaque paint can enhance understanding of the disclosed technology. Imagine each tier in a file system represented by a separate pane of glass with opaque paint in the "blocks" where files are present. The file system declares an ordering for the multiple tiers—an ordered stack of painted panes of glass (or a transparent pane if no data exists in the blocks for a tier). By back-lighting the stack of panes, the top layer of colors becomes visible and the visible colors represent the current, up-to-date data blocks.

Figure 2:
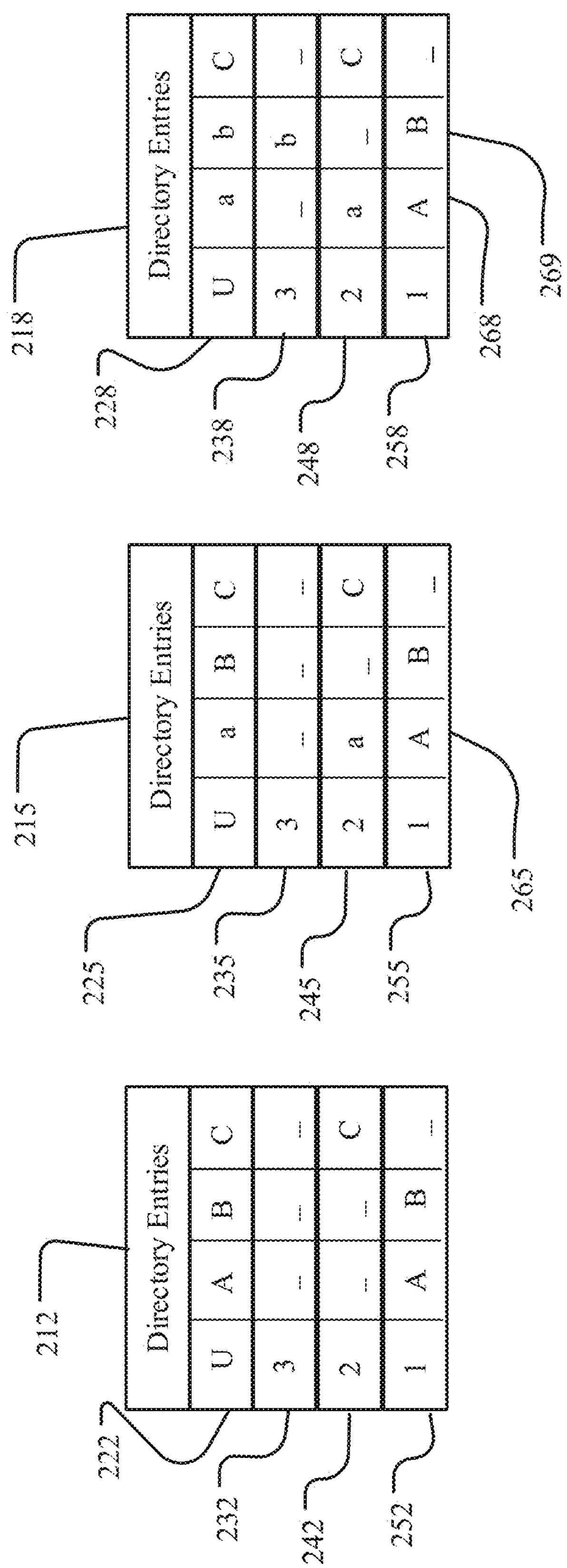
FIG. 2 shows example sets of directory entries in a multi-tier file system, for implementing access to content.

FIG. 2 shows an example file system with three distinct sets of directory entries 212, 215 and 218. Each set of directory entries includes three tiers, each with a simple example file X. Blank lines in the sets of directory entries 212, 215 and 218 represent holes—placeholders for data. The holes have links that refer read access to blocks in one or more earlier tiers of the directory entries. Each tier—tier one 252, tier two 242 and tier three 232—in directory entries 212 has length three blocks and contains a file X. In this example, blocks in the file are represented as single characters, for ease of visualization.

In directory entries 212, mount point U 222 shows the result of applying the disclosed method of access to content. U unifies tier one, tier two and tier three—in that order; blocks without holes, in layers above, obscure blocks in lower tiers. For directory entries with tier one 252, tier two 242 and tier three 232, U is ABC. U includes data C from the second tier 242 and data AB acquired from tier one 252 by following links associated with the holes of tier three 232, to access blocks and provide data from the first tier file.

Continuing with FIG. 2, for a second set of directory entries 215, tier two 248 contains "a_C" (instead of ___ C in tier two 242 of directory entries 212) and the unified view of file X 225 is "aBC". That is, when reading the unified version of file X 225, the lack of a hole in tier two 245 overrides the contents of tier one 255 block zero 265.

Continuing to the third set of directory entries 218 in FIG. 2, tier two 245 contains "a_C" (the same as for directory entries 215) and tier three 238 contains "_b_". The unified view of file X 228 is "abC". That is, when reading the unified version of file X 228, the lack of a hole in tier two 245 overrides the contents of tier one 258 block zero 268, and the lack of a hole in tier three 238 overrides the contents of tier one 258 block two 269. The holes, represented by blank lines, have links that refer read access to blocks in one or more earlier tiers. The concepts elucidated in FIG. 2 and the accompanying narrative can be applied on a broad scale.

A tombstone is a special directory entry that marks a file as not in use, so don't even bother looking to the next layer—as though an empty non-sparse (no holes to see through) version of the file has been created, except that no new file appears in the directory listing. For the disclosed technology, replacing a previously tombstoned file would not create a sparse file allowing holes. For some use cases, the creation of ~X, a tombstone for X, can cause lookups for file X to be guaranteed to fail. When the tombstone exists in the directory, creation of a new X can leave ~X. For directories containing both file X and tombstone X, the tombstone is situated behind the non-tombstone file X—blocking access behind the tombstone. The tombstone or whiteout files can provide a backstop for the union of layered files—a line of demarcation not to be crossed when merging files.

New generation files can either copy existing blocks of data forward from existing tiers into newer tiers (filling the holes), or can preserve the holes by failing to present any data at a block location. To create a new entirely hole-y version of a file, such as the two shown in tier three 232 and tier two 235, the file system can declare the length to be at least the maximum length of all the files being considered, but provide no mapping for any block. If such a new file is the top layer of a stack of files to be unified, reading any block already in the file will result in reading through the empty top layer, and reading will produce the same result as reading from the stack with no top layer.

The file system can be configured to automatically copy forward blocks of data from the first tier file to the second tier file, either as scheduled, or responsive to an authorized write access to a particular block of the second tier file. The copy forward occurs at the earlier of the two events: a scheduled copy forward or a write request to a particular block.

For a scheduled copy forward, the same data is available before and after the copy forward, with the effect of defragmenting the file, an action semantically transparent to the requestor—transparently grouping the data together, for retrieval.

Prior to completion of the copying forward, the file system responds to an access request by accessing the second tier file by providing data available from the second tier file that has been copied forward and by following links associated with the holes to access blocks in the first tier file to provide data from the first tier file.

The file system automatically initializes a third tier file, accessible using the same path and file name as the second tier file. The third tier file has one or more holes as placeholders for data in the second tier file, the holes having links that refer read access to blocks in one or more earlier tiers of the third tier file. The disclosed method includes applying the copying and the responding to an access request for the third tier file.

The inode for a file can be viewed as an array of disk locations or holes. The contents for a disk block are located by indexing to that position in the array and following the indirection. FIG. 3 shows an example inode table 314 for implementing three tiers of a directory entry. The inode represents the block index explicitly, containing pairs (b, d) 325, where b is the disk block index and d is the physical location on disk at which to find the contents of block b, or is missing so is interpreted as a block of zeros—a holey file. Additionally, the inode contains the index of the largest block number contained in the file.

The holes in a tier are implemented using a block index and a physical location that is either null or specifies an address on disk of the block pointed to by the block index; and for the physical location that is null, diverting read access to blocks of data in one or more earlier tiers of the second tier file.

Figure 4:
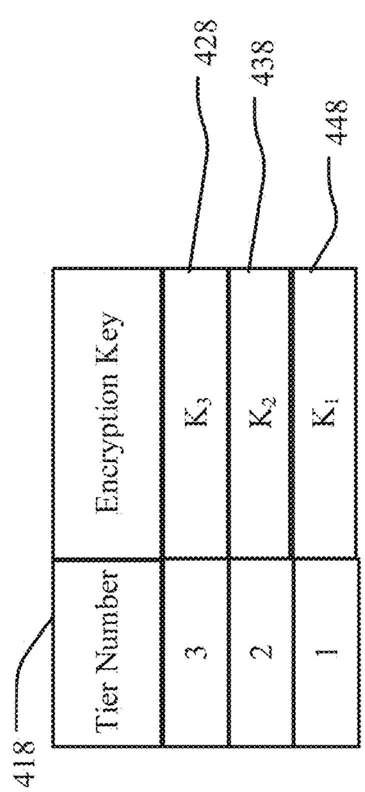
FIG. 4 is an example table with tiers and related encryption keys.

FIG. 4 shows an example relationship between tiers of a file system directory and encryption keys 418. First tier file and other files of the first tier are encrypted using a first encryption key $K_1$ 448; and then a second encryption key $K_2$ 438 is applied to encrypt data in the second tier file and other files of the second tier during the copying forward and write access described earlier. A third encryption key $K_3$ 428 gets applied to encrypt data in a third tier file and other files of the third tier during the copying forward and write access. Data gets written to the second tier file using the second encryption key, as an update to data provided from the first tier file, during the copying forward from the first tier file to the second tier file To implement encryption key rotation for the disclosed technology, the file system can create non-union directories to represent each key rotation, with time and date of key generation, in one use case. The non-union directories would be placed first in a union with the tier of the immediately previous generation. This implementation would include walking down the history list to fully enumerate all components of the union. Alternatively, a union explicitly listing all the still-active previous directories could be constructed, to reduce effort on the union directory lookups so that the flattening of the directory paths could be performed only once, instead of every time the union directory was opened. In another use case, this flattening of the directory paths can be deferred until the first time the union gets opened.

In one implementation, to follow links associated with the holes, to access blocks in the base generation file (tier one in the example described earlier) and provide data from the base generation file, the system opens a file that automatically causes a pseudo-inode to be constructed with a matching length as declared in the first file that matches, but with the ordered merger of the inode lists with a pair of file and block indices so that scans of that list point accurately to the file and the block in the file to be read. This block can then be merged into the top-level inode, eliminating the hole at that level, by revectoring the block to a new location containing the same content.

In another implementation of the disclosed technology, a file could have an offset and a list of blocks starting from that offset, so that all holes would be at the front of the file. In that case, a new tier could be created with an offset equal to the sum of the lengths of previous files, which would leave space for those files to be seen through the empty space. Copy forward would work differently in this case, moving data blocks from the end of a middle file to the head of the newest file, and adjusting offsets and lengths as blocks are transferred—decrementing the length of the middle file and the offset of the newest file, and increasing the length of the newest file to preserve total length. This implementation would entail substantial data motion, which can be handled using a linking structure.

In the described file system, the absence of an explicit storage block in the inode for an address can be interpreted to mean that the next file in the stack which does offer a block at that address wins. A unifying virtual inode can include a list of triples (a, f, b). In the virtual inode, created to improve performance, the list can be sorted by the 'a' field (and have at most one entry of 'f,b' for each 'a'. The f field specifies in which file the address will be resolved, and the data resides in b. The f specifies which file system to write, and can include a specification of whether the data is read-only.

The use of holes described herein, that makes it possible for earlier versions to show through is a semantic change to the standard meaning of sparse files, in which the current operating system treats holes as implicit blocks of zeroes. This use can be implemented as a user-selectable setting for creating a file system union, preserving the more standard notion, as selected by the user. If the setting is user-controllable at the specification of layering in the union, hybrid schemes—in which an opaque layer can be inserted at will to preserve the existing semantics—can readily be implemented.

In one use case in which applications make use of files with holes in this different context, the disclosed change in the semantics of a union and the value of blocks in files with holes can motivate the use of separated disk space, and use of a wholly opaque file, to preserve the semantics of affected applications. In another use case, a mount-time configuration option can include options as to how to interpret holes in stacked files.

For some implementations, to migrate all file content to the tier with the newest encryption key, a background cache can be implemented while copy forward of the content is completed—so the copy in the most recent tier no longer has holes. Optionally, the earlier encryption keys can be retired and files in earlier tiers can be deleted, to free disk space and thwart access using retired keys.

Another implementation can use layers of virtual floppy disk (vfd) disk image files with sparse file capabilities, as have been used in some versions of Windows New Technology File System (NTFS). Each vfd file layer can be encrypted using a different BitLocker key. Copy forward can be implemented with multiple layers of identically-named, hole-y vfd files, via a union mount developed using a software interface such as the Dokan Library. The Dokan Library can be used for copying data from one vfd file layer to a different vfd file layer with a different encryption key, and ensuring that the mapping gets adapted so that the resultant file address is identifiable.

Workflow

Figure 5:
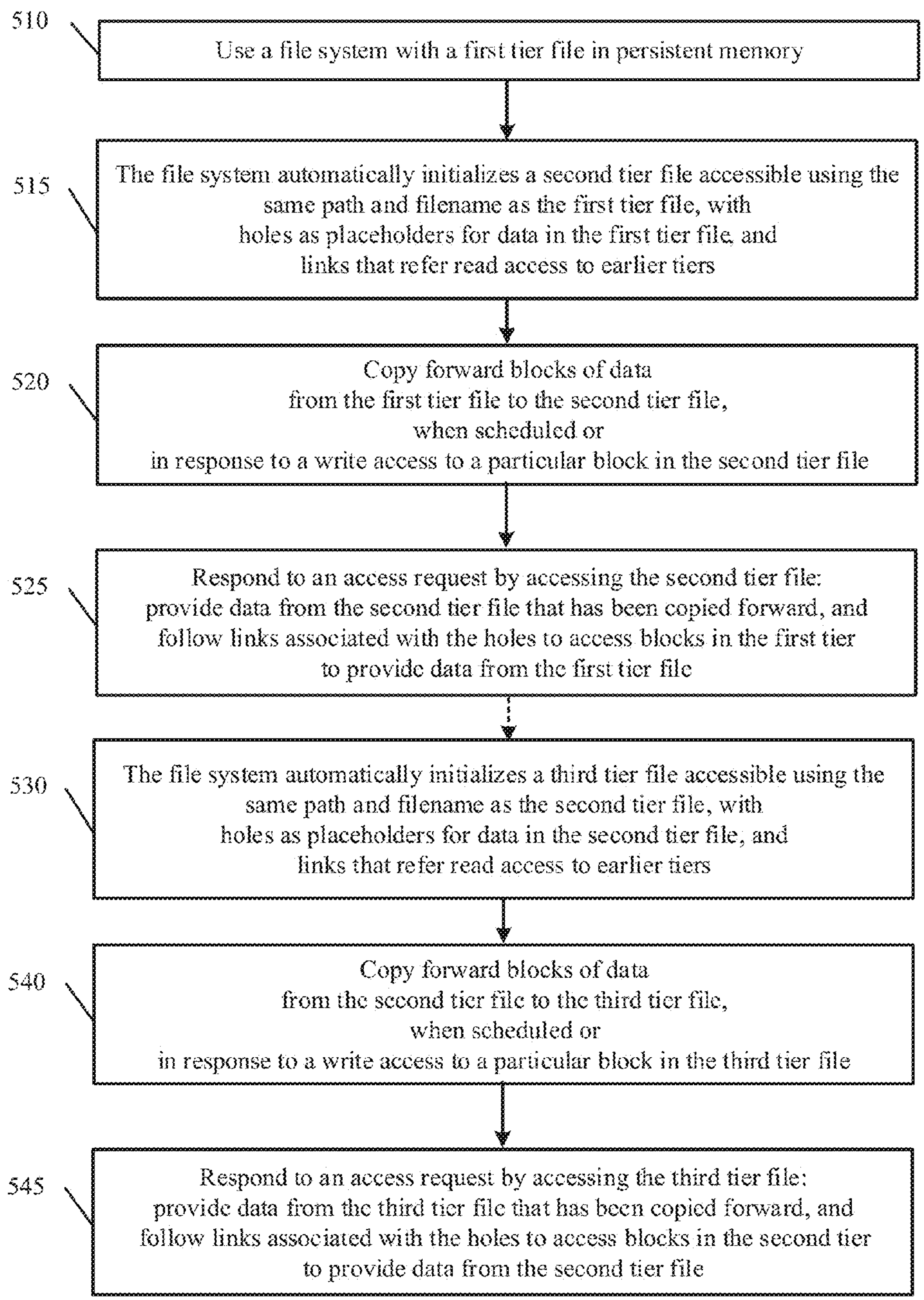
FIG. 5 is an example workflow for a multi-tier file system with transparent holes.

FIG. 5 is a flowchart 500 of one implementation of an environment to access content in a multi-tier file system. Flowchart 500 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to a method.

At action 510, use a file system having a first tier file in persistent memory, and the file system running on a hardware processor.

At action 515, the file system automatically initializes a second tier file in the persistent memory, wherein the second tier file is accessible using a same path and file name as the first tier file, and the second tier file has one or more holes as placeholders for data in the first tier file, the holes having links that refer read access to blocks in one or more earlier tiers of the second tier file.

At action 520, copy forward blocks of data from the first tier file to the second tier file, at an earlier of as scheduled or responsive to an authorized write access to a particular block of the second tier file.

At action 525, prior to completion of the copying forward, the file system responds to an access request by accessing the second tier file by providing data available from the second tier file that has been copied forward and by following links associated with the holes to access blocks in the first tier file to provide data from the first tier file.

At action 530, the file system automatically initializes a third tier file accessible using the same path and filename as the second tier file, with holes as placeholders for data in the second tier file, and having links that refer read access to earlier tiers.

At action 540, the file system automatically copies forward blocks of data from the second tier file to the third tier file, when scheduled or in response to a write access to a particular block in the third tier file.

At action 545, the file system responds to an access request by accessing the third tier file by providing data from the third tier file that has been copied forward, and following links in the holes to access blocks in the second tier to provide data from the second tier file. Prior to completion of copying forward of data from the second tier file to the third tier file, the file system follows links in the holes to access blocks in the second tier file to provide data from the second tier file.

Figure 6:
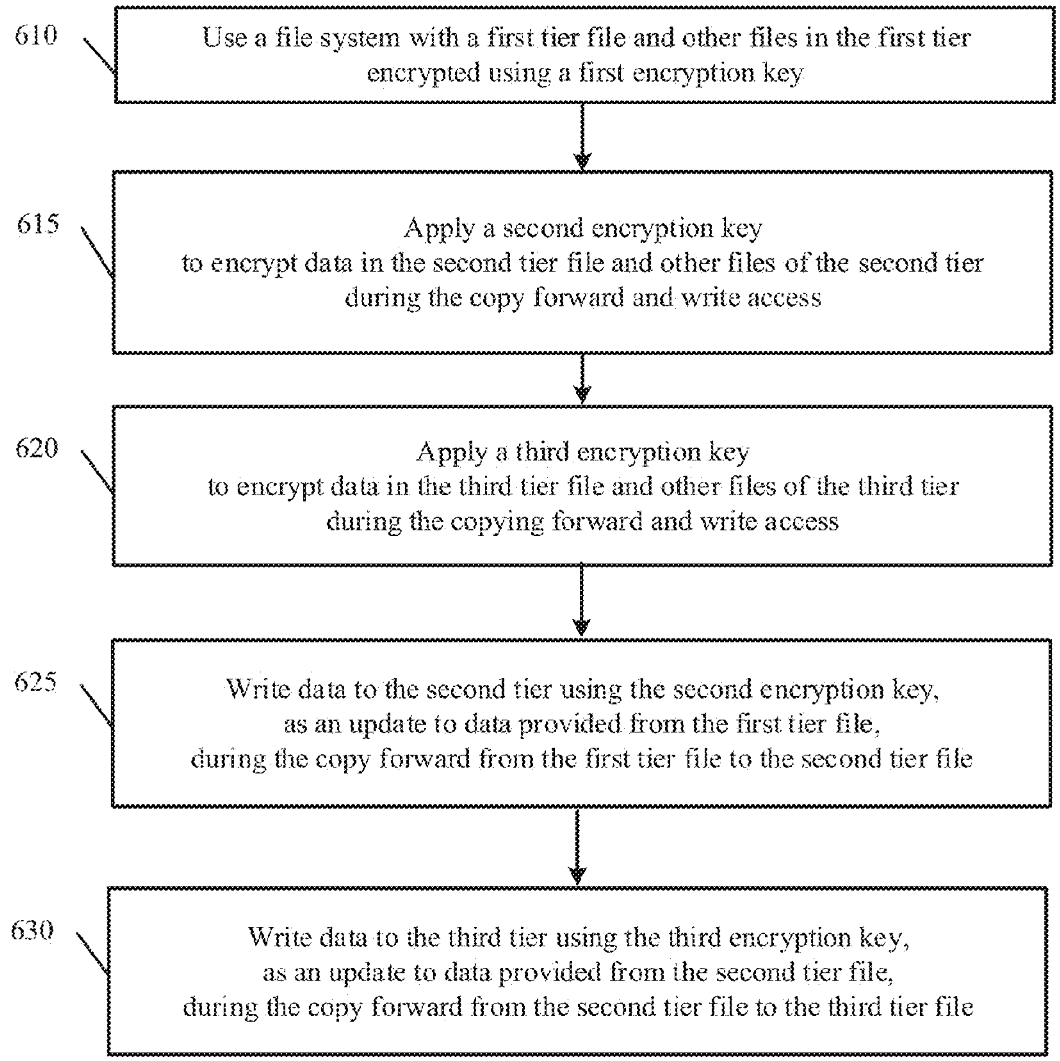
FIG. 6 is an example workflow for a multi-tier file system for implementing file system level key rotation.

FIG. 6 is a flowchart 600 of one implementation of an environment to access content in a multi-tier file system to implement encryption key rotation. Other implementations may perform the actions in different orders and/or with different, fewer or additional actions than those illustrated in FIG. 6. Multiple actions can be combined in some implementations. For convenience, this flowchart is described with reference to a method.

At action 610, use a file system having a first tier file and other files in the first tier encrypted using a first encryption key, and the file system running on a hardware processor.

At action 615, apply a second encryption key to encrypt data in the second tier file and other files of the second tier during the copying forward and write access.

At action 620, apply a third encryption key to encrypt data in a third tier file and other files of the third tier during the copying forward and write access.

At action 625, write data to the second tier file using the second encryption key, as an update to data provided from the first tier file, during the copying forward from the first tier file to the second tier file.

At action 630, write data to the third tier using the third encryption key, as an update to data provided from the second tier file, during the copy forward from the second tier file to the third tier file.

The actions described above can be subdivided into more steps or combined into fewer steps to carry out the method described using a different number or arrangement of steps.

Multi-Tenant Integration

Figure 7:
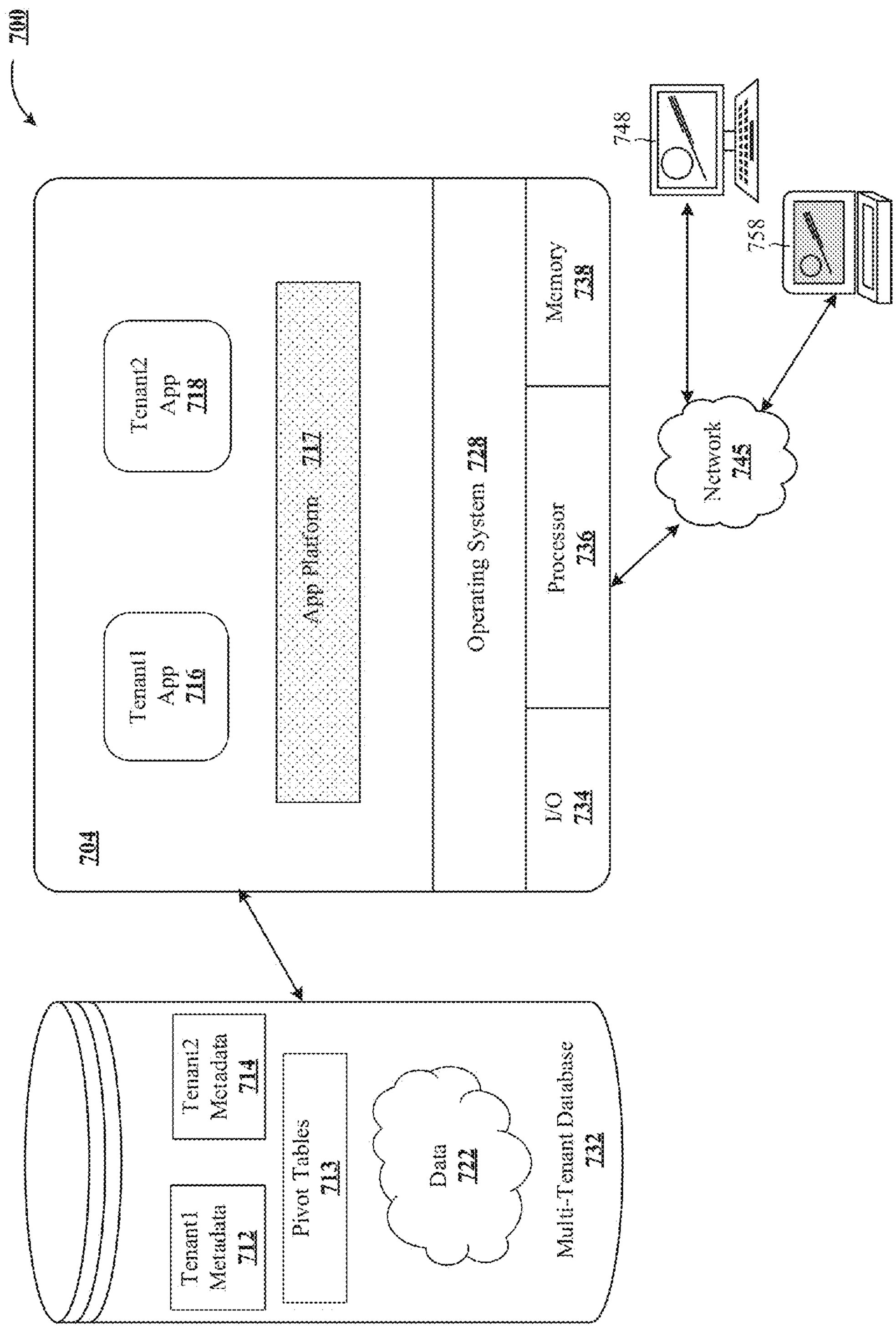
FIG. 7 is an example environment for implementing file system level key rotation in a multi-tier file system with transparent holes.

FIG. 7 presents a block diagram of an exemplary multi-tenant system 700 suitable for implementing file system level key rotation in a multi-tier file system with transparent holes in environment 100 of FIG. 1. In general, the illustrated multi-tenant system 700 of FIG. 7 includes a server 704 that dynamically supports virtual applications 716 and 718, based upon data 722 from a common database 732 that is shared between multiple tenants, alternatively referred to herein as a "multi-tenant database". Data and services generated by the virtual applications 716 and 718, including GUI clients, are provided via a network 745 to any number of client devices 748 or 758, as desired.

As used herein, a "tenant" or an "organization" refers to a group of one or more users that shares access to common subset of the data within the multi-tenant database 732. In this regard, each tenant includes one or more users associated with, assigned to, or otherwise belonging to that respective tenant. Stated another way, each respective user within the multi-tenant system 700 is associated with, assigned to, or otherwise belongs to a particular tenant of the plurality of tenants supported by the multi-tenant system 700. Tenants may represent users, user departments, work or legal organizations, and/or any other entities that maintain data for particular sets of users within the multi-tenant system 700. Although multiple tenants may share access to the server 704 and the database 732, the particular data and services provided from the server 704 to each tenant can be securely isolated from those provided to other tenants. The multi-tenant architecture therefore allows different sets of users to share functionality and hardware resources without necessarily sharing any of the data 722 belonging to or otherwise associated with other tenants.

The multi-tenant database 732 is any sort of repository or other data storage system capable of storing and managing the data 722 associated with any number of tenants. The database 732 may be implemented using any type of conventional database server hardware. In various implementations, the database 732 shares processing hardware with the server 704. In other implementations, the database 732 is implemented using separate physical and/or virtual database server hardware that communicates with the server 704 to perform the various functions described herein. The multi-tenant database 732 may alternatively be referred to herein as an on-demand database, in that the multi-tenant database 732 provides (or is available to provide) data at run-time to on-demand virtual applications 716 or 718 generated by the application platform 717, with tenant1 metadata 712 and tenant2 metadata 714 securely isolated.

In practice, the data 722 may be organized and formatted in any manner to support the application platform 722. In various implementations, conventional data relationships are established using any number of pivot tables 713 that establish indexing, uniqueness, relationships between entities, and/or other aspects of conventional database organization as desired.

The server 704 is implemented using one or more actual and/or virtual computing systems that collectively provide the dynamic application platform 717 for generating the virtual applications. For example, the server 704 may be implemented using a cluster of actual and/or virtual servers operating in conjunction with each other, typically in association with conventional network communications, cluster management, load balancing and other features as appropriate. The server 704 operates with any sort of conventional processing hardware such as a processor 736, memory 738, input/output features 734 and the like. The input/output 734 generally represent the interface(s) to networks (e.g., to the network 745, or any other local area, wide area or other network), mass storage, display devices, data entry devices and/or the like. User interface input devices 734 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 717.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 736 to the user or to another machine or computer system.

The processor 736 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 738 represents any non-transitory short or long term storage or other computer-readable media capable of storing programming instructions for execution on the processor 736, including any sort of random access memory (RAM), read only memory (ROM), flash memory, magnetic or optical mass storage, and/or the like. The computer-executable programming instructions, when read and executed by the server 704 and/or processor 736, cause the server 704 and/or processor 736 to create, generate, or otherwise facilitate the application platform 717 and/or virtual applications 716 and 718, and perform one or more additional tasks, operations, functions, and/or processes described herein. It should be noted that the memory 738 represents one suitable implementation of such computer-readable media, and alternatively or additionally, the server 704 could receive and cooperate with external computer-readable media that is realized as a portable or mobile component or application platform, e.g., a portable hard drive, a USB flash drive, an optical disc, or the like.

The application platform 717 is any sort of software application or other data processing engine that generates the virtual applications 716 and 718 that provide data and/or services to the client devices 748 and 758. In a typical implementation, the application platform 717 gains access to processing resources, communications interfaces and other features of the processing hardware using any sort of conventional or proprietary operating system 728. The virtual applications 716 and 718 are typically generated at run-time in response to input received from the client devices 748 and 758.

With continued reference to FIG. 7, the data and services provided by the server 704 can be retrieved using any sort of personal computer, mobile telephone, tablet or other network-enabled client device 748 or 758 on the network 745. In an exemplary implementation, the client device 748 or 758 includes a display device, such as a monitor, screen, or another conventional electronic display capable of graphically presenting data and/or information retrieved from the multi-tenant database 732.

In some implementations, network(s) 745 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

In one implementation, a method of access to content in a multi-tier file system is disclosed, which includes using a file system that has a first tier file in persistent memory, and the file system running on a hardware processor. The file system automatically initializes a second tier file in the persistent memory, in which the second tier file is accessible using a same path and file name as the first tier file, and the second tier file has one or more holes as placeholders for data in the first tier file, the holes having links that refer read access to blocks in one or more earlier tiers of the second tier file. The method also includes copying forward blocks of data from the first tier file to the second tier file, at an earlier of as scheduled or responsive to an authorized write access to a particular block of the second tier file; and prior to completion of the copying forward, the file system responding to an access request by accessing the second tier file by providing data available from the second tier file that has been copied forward and by following links in the holes to access blocks in the first tier file to provide data from the first tier file.

This method and other implementations of the technology disclosed can include one or more of the following features and/or features described in connection with additional methods disclosed. In the interest of conciseness, the combinations of features disclosed in this application are not individually enumerated and are not repeated with each base set of features.

The disclosed method further includes the file system automatically initializing a third tier file, in which the third tier file is accessible using a same path and file name as the second tier file, and the third tier file has one or more holes as placeholders for data in the second tier file, the holes having links that refer read access to blocks in one or more earlier tiers of the third tier file; and applying the copying and the responding to an access request for the third tier file.

In some implementations, the disclosed method further includes, prior to completion of copying forward of data from the second tier file to the third tier file, the file system following links in the holes to access blocks in the second tier file to provide data from the second tier file.

In some implementations, the disclosed method also includes the first tier file and other files of the first tier encrypted using a first encryption key; and applying a second encryption key to encrypt data in the second tier file and other files of the second tier during the copying forward and write access. The disclosed method of claim further includes applying a third encryption key to encrypt data in a third tier file and other files of the third tier during the copying forward and write access.

In some implementations of the disclosed technology includes a method in which the holes are implemented using a block index and a physical location that is either null or specifies an address on disk of the block pointed to by the block index; and for the physical location that is null, diverting read access to blocks of data in one or more earlier tiers of the second tier file.

The disclosed method further includes providing data from a combination of the second and first tier files during the copying forward from the first tier file to the second tier file. The technology disclosed also includes writing data to the second tier file, as an update to data provided from the first tier file, during the copying forward from the first tier file to the second tier file.

In some implementations, the disclosed method includes writing data to the second tier file using the second encryption key, as an update to data provided from the first tier file, during the copying forward from the first tier file to the second tier file.

Another implementation may include a device that provides access to content in a multi-tier file system, the device including a processor, memory coupled to the processor, and computer instructions loaded into the memory that, when executed, cause the processor to implement a process that can implement any of the methods described above.

Yet another implementation may include a tangible computer readable storage medium including computer program instructions that, when executed, cause a computer to implement any of the methods described earlier.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of access to content in a multi-tier file system including a first tier file and a second tier file stored in a persistent memory, the method comprising:

initializing, by one or more processors, the second tier file in the persistent memory, wherein the second tier file is accessible using a same path and file name as the first tier file, and the second tier file has a second tier hole as a placeholder for data in the first tier file, the second tier hole having a second tier link that refers read access to a block in the first tier file;

copying, by the one or more processors, forward blocks of data from the first tier file to the second tier file based on a scheduled copy forward or an authorized write access to a particular block of the second tier file; and responding, by the one or more processors, to an access request by providing data available from the second tier file that has been copied forward and by following the second tier link associated with the second tier hole to access the block in the first tier file to provide data from the first tier file, wherein the responding is prior to completion of the copying forward.

2. The method of claim 1, further including:

initializing, by the one or more processors, a third tier file in the persistent memory, wherein the third tier file is accessible using a same path and file name as the second tier file, and the third tier file has a third tier hole as a placeholder for data in the second tier file, the third tier hole having a third tier link that refers read access to a block in an earlier tier of the third tier file; and applying the copying and the responding to the access request, wherein the access request corresponds to the third tier file.

3. The method of claim 2, wherein the block in the earlier tier of the third tier file is a block in the second tier file, and prior to completion of copying forward of data from the second tier file to the third tier file, the file system following the third tier link associated with the third tier hole to access the block in the second tier file to provide data from the second tier file.

4. The method of claim 1, further including:

encrypting the first tier file and other files of the first tier using a first encryption key; and applying a second encryption key to encrypt data in the second tier file and other files of the second tier during the copying forward and write access.

5. The method of claim 4, further including:

applying a third encryption key to encrypt data in a third tier file and other files of the third tier during the copying forward and write access.

6. The method of claim 1, wherein:

the second tier hole is implemented using a block index and a physical location that is either null or specifies an address on disk of the block in the earlier tier of the second tier file pointed to by the block index; and for the physical location that is null, diverting read access to blocks of data in one or more earlier tiers of the second tier file.

7. The method of claim 1, further including providing data from a combination of the second tier file and first tier file during the copying forward from the first tier file to the second tier file.

8. The method of claim 1, further including writing update data to the second tier file as an update to the data provided from the first tier file during the copying forward from the first tier file to the second tier file.

9. The method of claim 4, further including writing update data to the second tier file using the second encryption key as an update to the data provided from the first tier file during the copying forward from the first tier file to the second tier file.

10. A device that provides access to content in a multi-tier file system, the device including:

a processor, memory coupled to the processor, and computer instructions loaded into the memory that, when executed, cause the processor to implement a process that includes:

using a file system having a first tier file in persistent memory, and the file system running on a hardware processor:

the file system automatically initializing a second tier file in the persistent memory, wherein the second tier file is accessible using a same path and file name as the first tier file, and the second tier file has a second tier hole as a placeholder for data in the first tier file, the hole having a second tier link that refers read access to a block in an earlier tier of the second tier file;

copying forward blocks of data from the first tier file to the second tier file based on a scheduled copy forward or an authorized write access to a particular block of the second tier file; and prior to completion of the copying forward, the file system-responding to an access request by accessing the second tier file by providing data available from the second tier file that has been copied forward and by following the second tier link associated with the second tier hole to access the block in the first tier file to provide data from the first tier file.

11. The device of claim 10, further including the file system automatically initializing a third tier file, wherein the third tier file is accessible using a same path and file name as the second tier file, and the third tier file has a third tier hole as placeholder for data in the second tier file, the third tier hole having a third tier link that refers read access to a block in an earlier tier of the third tier file; and applying the copying and the responding to an access request for the third tier file.

12. The device of claim 11, wherein the block in the earlier tier of the third tier file is a block in the second tier file, and:

prior to completion of copying forward of data from the second tier file to the third tier file, the file system following the third tier link associated with the third tier hole to access the block in the second tier file to provide data from the second tier file.

13. The device of claim 10, further including:

encrypting the first tier file and other files of the first tier using a first encryption key; and applying a second encryption key to encrypt data in the second tier file and other files of the second tier during the copying forward and write access.

14. The device of claim 13, further including:

applying a third encryption key to encrypt data in a third tier file and other files of the third tier during the copying forward and write access.

15. The device of claim 10, wherein:

the second tier hole is implemented using a block index and a physical location that is either null or specifies an address on disk of the block in the earlier tier of the second tier file pointed to by the block index; and for the physical location that is null, diverting read access to blocks of data in one or more earlier tiers of the second tier file.

16. The device of claim 10, further including providing data from a combination of the second and first tier files during the copying forward from the first tier file to the second tier file.

17. The device of claim 10, further including writing update data to the second tier file as an update to data provided from the first tier file during the copying forward from the first tier file to the second tier file.

18. The device of claim 13, further including writing update data to the second tier file using the second encryption key, as an update to data provided from the first tier file during the copying forward from the first tier file to the second tier file.

19. A non-transitory computer readable storage medium that stores program instructions that, when executed, cause a computer to implement a method of access to content in a multi-tier file system, the implementation including:

using a file system having a first tier file in persistent memory, and the file system running on a hardware processor:

the file system automatically initializing a second tier file in the persistent memory, wherein the second tier file is accessible using a same path and file name as the first tier file, and the second tier file has a second tier hole as a placeholder for data in the first tier file, the second tier hole having a second tier link that refers read access to a block in an earlier tier of the second tier file;

copying forward blocks of data from the first tier file to the second tier file based on a scheduled copy or an authorized write access to a particular block of the second tier file; and prior to completion of the copying forward, the file system responding to an access request by accessing the second tier file by providing data available from the second tier file that has been copied forward and by following the second tier link associated with the second tier hole to access the block in the first tier file to provide data from the first tier file.

20. The non-transitory computer readable storage medium of claim 19, the implementation further including:

the file system automatically initializing a third tier file, wherein the third tier file is accessible using a same path and file name as the second tier file, and the third tier file has a third tier hole as placeholder for data in the second tier file, the third tier hole having a third tier link that refers read access to a block in an earlier tier of the third tier file; and applying the copying and the responding to an access request for the third tier file.

21. The non-transitory computer readable storage medium of claim 19, the implementation further including:

encrypting the first tier file and other files of the first tier using a first encryption key; and applying a second encryption key to encrypt data in the second tier file and other files of the second tier during the copying forward and write access.

22. The non-transitory computer readable storage medium of claim 21, the implementation further including:

applying a third encryption key to encrypt data in a third tier file and other files of the third tier during the copying forward and write access.

23. The non-transitory computer readable storage medium of claim 19, wherein:

the second tier hole is implemented using a block index and a physical location that is either null or specifies an address on disk of the block in the earlier tier of the second tier file pointed to by the block index; and for the physical location that is null, diverting read access to blocks of data in one or more earlier tiers of the second tier file.

24. The non-transitory computer readable storage medium of claim 19, the implementation further including providing data from a combination of the second tier and first tier file during the copying forward from the first tier file to the second tier file.

25. The non-transitory computer readable storage medium of claim 22, the implementation further including writing update data to the second tier file using the second encryption key as an update to data provided from the first tier file during the copying forward from the first tier file to the second tier file.

* * * * *